United States Patent
Hoshi et al.

(10) Patent No.: US 10,684,862 B2
(45) Date of Patent: Jun. 16, 2020

(54) PROCESSOR SYNTHESIS DEVICE, PROCESSOR SYNTHESIS METHOD, AND COMPUTER READABLE MEDIUM

(71) Applicant: MITSUBISHI ELECTRIC CORPORATION, Tokyo (JP)

(72) Inventors: Takumi Hoshi, Tokyo (JP); Tetsuo Yano, Tokyo (JP); Hiroyuki Yamamoto, Tokyo (JP); Seidai Takeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 49 days.

(21) Appl. No.: 16/067,775

(22) PCT Filed: Jan. 8, 2016

(86) PCT No.: PCT/JP2016/050525
§ 371 (c)(1),
(2) Date: Jul. 2, 2018

(87) PCT Pub. No.: WO2017/119123
PCT Pub. Date: Jul. 13, 2017

(65) Prior Publication Data
US 2019/0004809 A1    Jan. 3, 2019

(51) Int. Cl.
*G06F 17/50* (2006.01)
*G06F 9/38* (2018.01)
(Continued)

(52) U.S. Cl.
CPC .......... *G06F 9/3851* (2013.01); *G06F 1/3237* (2013.01); *G06F 1/3243* (2013.01);
(Continued)

(58) Field of Classification Search
USPC .................................................. 716/100–106
See application file for complete search history.

(56) References Cited

U.S. PATENT DOCUMENTS 6,195,786 B1   2/2001  Raghunathan et al.
6,493,863 B1   12/2002 Hamada et al.
(Continued)

FOREIGN PATENT DOCUMENTS

JP       3150122 B2     3/2001
JP       2001-142922 A  5/2001
(Continued)

OTHER PUBLICATIONS

Office Action(Notification of Reasons for Refusal) dated Dec. 4, 2018, by the Japan Patent Office in corresponding Japanese Patent Application No. 2017-560010 and English translation of the Office Action. (6 pages).

(Continued)

*Primary Examiner* — Binh C Tat
(74) *Attorney, Agent, or Firm* — Buchanan Ingersoll & Rooney PC

(57) ABSTRACT

A processor synthesis device inserts a stop circuit into a circuit configuration, which is defined by processor model information and includes a plurality of operators, based on instruction set information that defines an instruction set including a plurality of instructions, the stop circuit stopping an operator not used in an instruction to be executed among the plurality of operators when each of the plurality of instructions is executed. The processor synthesis device generates processor synthesis information which is an RTL description defining a circuit configuration into which the stop circuit is inserted.

14 Claims, 13 Drawing Sheets

(51) Int. Cl.
G06F 1/3234 (2019.01)
G06F 1/3237 (2019.01)
G06F 30/327 (2020.01)
G06F 1/3287 (2019.01)
G06F 9/30 (2018.01)
G06F 115/10 (2020.01)

(52) U.S. Cl.
CPC .......... G06F 1/3287 (2013.01); G06F 9/3005 (2013.01); G06F 30/327 (2020.01); *G06F 2115/10* (2020.01)

(56) References Cited

U.S. PATENT DOCUMENTS

| | | | |
|---|---|---|---|
| 2002/0188923 A1 | 12/2002 | Ohnishi | |
| 2003/0226051 A1 | 12/2003 | Nakajima | |
| 2006/0259889 A1* | 11/2006 | Crosetto | G06F 9/3867 716/126 |
| 2008/0092103 A1* | 4/2008 | Aoyama | G06F 17/505 716/104 |
| 2009/0055668 A1 | 2/2009 | Fernsler et al. | |
| 2009/0217068 A1 | 8/2009 | Fernsler, Jr. et al. | |
| 2014/0189633 A1* | 7/2014 | Yamamoto | G06F 17/505 716/134 |

FOREIGN PATENT DOCUMENTS

| | | |
|---|---|---|
| JP | 2001-290643 A | 10/2001 |
| JP | 2002-366596 A | 12/2002 |
| JP | 2003-345775 A | 12/2003 |
| JP | 2008-102619 A | 5/2008 |
| JP | 2008-282360 A | 11/2008 |
| JP | 2010-537293 A | 12/2010 |
| JP | 2013-196133 A | 9/2013 |

OTHER PUBLICATIONS

International Search Report (PCT/ISA/210) dated Apr. 5, 2016, by the Japanese Patent Office as the International Searching Authority for International Application No. PCT/JP2016/050525.

Written Opinion (PCT/ISA/237) dated Apr. 5, 2016, by the Japanese Patent Office as the International Searching Authority for International Application No. PCT/JP2016/050525.

Ittetsu Taniguchi et al., "Energy Aware Instruction Scheduling for Fine Grained Power Gated VLIW Processors", Nov. 22, 2010.

* cited by examiner

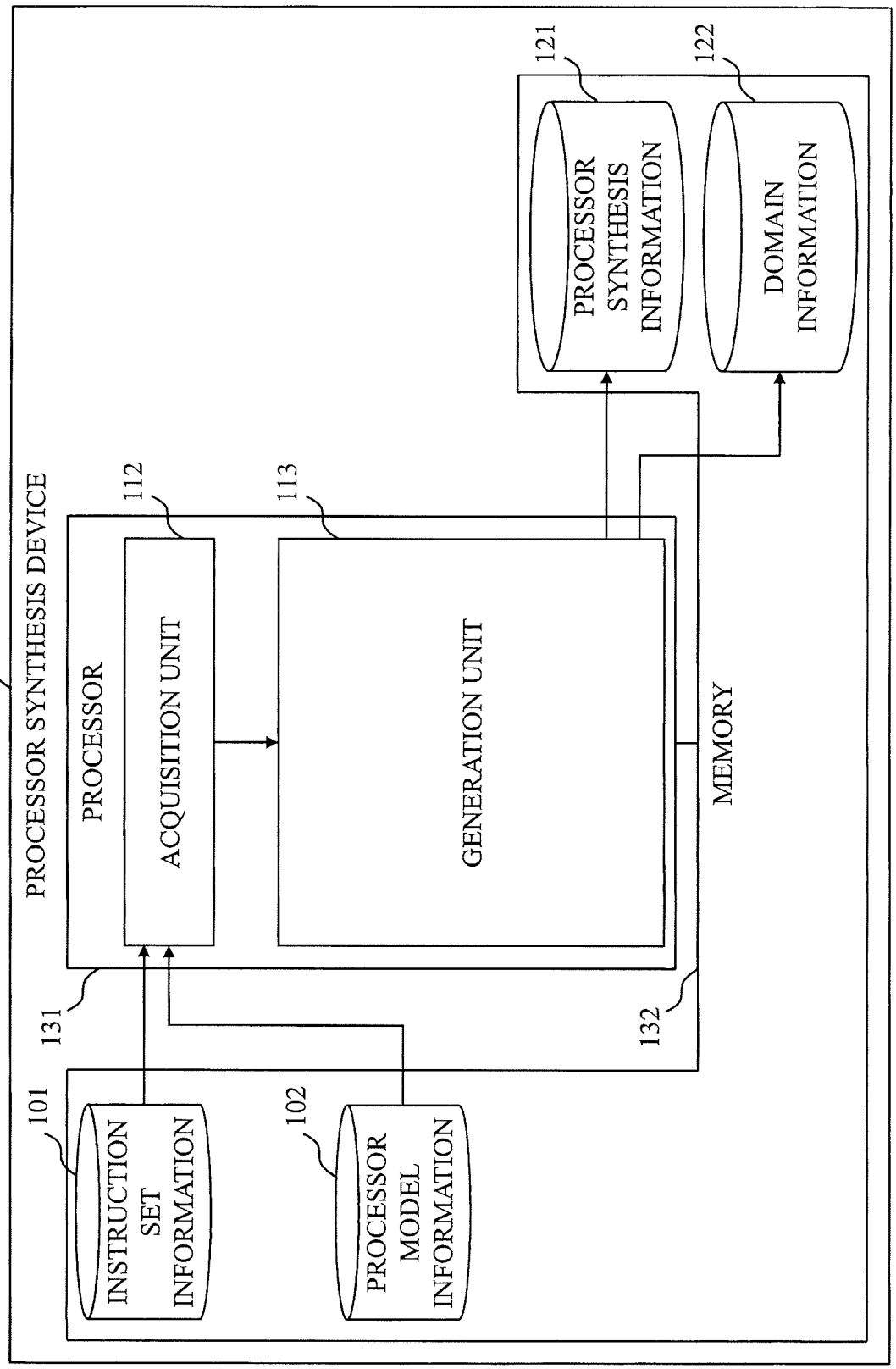

Fig. 2

| INSTRUCTION | DESCRIPTION | FUNCTION |
|---|---|---|
| ADD | ADD IMMEDIATE DATA (IM) TO REGISTER (REG) | REG <- REG + IM |
| SUB | SUBTRACT IMMEDIATE DATA (IM) FROM REGISTER (REG) | REG <- REG - IM |
| MUL | MULTIPLY REGISTER (REG) BY IMMEDIATE DATA (IM) (IMPLEMENT MULTIPLICATION BY USING ADDITION) | REG <- REG * IM |
| DIV | DIVIDE REGISTER (REG) BY IMMEDIATE DATA (IM) (IMPLEMENT DIVISION BY RESTORING DIVISION USING SHIFT, SUBTRACTION, COMPARISON, AND ADDITION) | REG <- REG / IM |

Fig. 11

| INSTRUCTION | DESCRIPTION | FUNCTION |
|---|---|---|
| ADD | ADD IMMEDIATE DATA (IM) TO REGISTER (RG) | REG <- REG + IM |
| SUB | SUBTRACT IMMEDIATE DATA (IM) FROM REGISTER (RG) | REG <- REG - IM |
| MUL | MULTIPLY REGISTER (RG) BY IMMEDIATE DATA (IM) (IMPLEMENT MULTIPLICATION BY USING ADDITION) | REG <- REG * IM |
| DIV | DIVIDE REGISTER (REG) BY IMMEDIATE DATA (IM) (IMPLEMENT DIVISION BY RESTORING DIVISION USING SHIFT, SUBTRACTION, COMPARISON, AND ADDITION) | REG <- REG / IM |
| ADD_ON | START OPERATOR NOT USED IN ADD INSTRUCTION | - |
| SUB_ON | START OPERATOR NOT USED IN SUB INSTRUCTION | - |
| MUL_ON | START OPERATOR NOT USED IN MUL INSTRUCTION | - |
| DIV_ON | START OPERATOR NOT USED IN DIV INSTRUCTION | - |
| ADD_OFF | STOP OPERATOR NOT USED IN ADD INSTRUCTION | - |
| SUB_OFF | STOP OPERATOR NOT USED IN SUB INSTRUCTION | - |
| MUL_OFF | STOP OPERATOR NOT USED IN MUL INSTRUCTION | - |
| DIV_OFF | STOP OPERATOR NOT USED IN DIV INSTRUCTION | - |

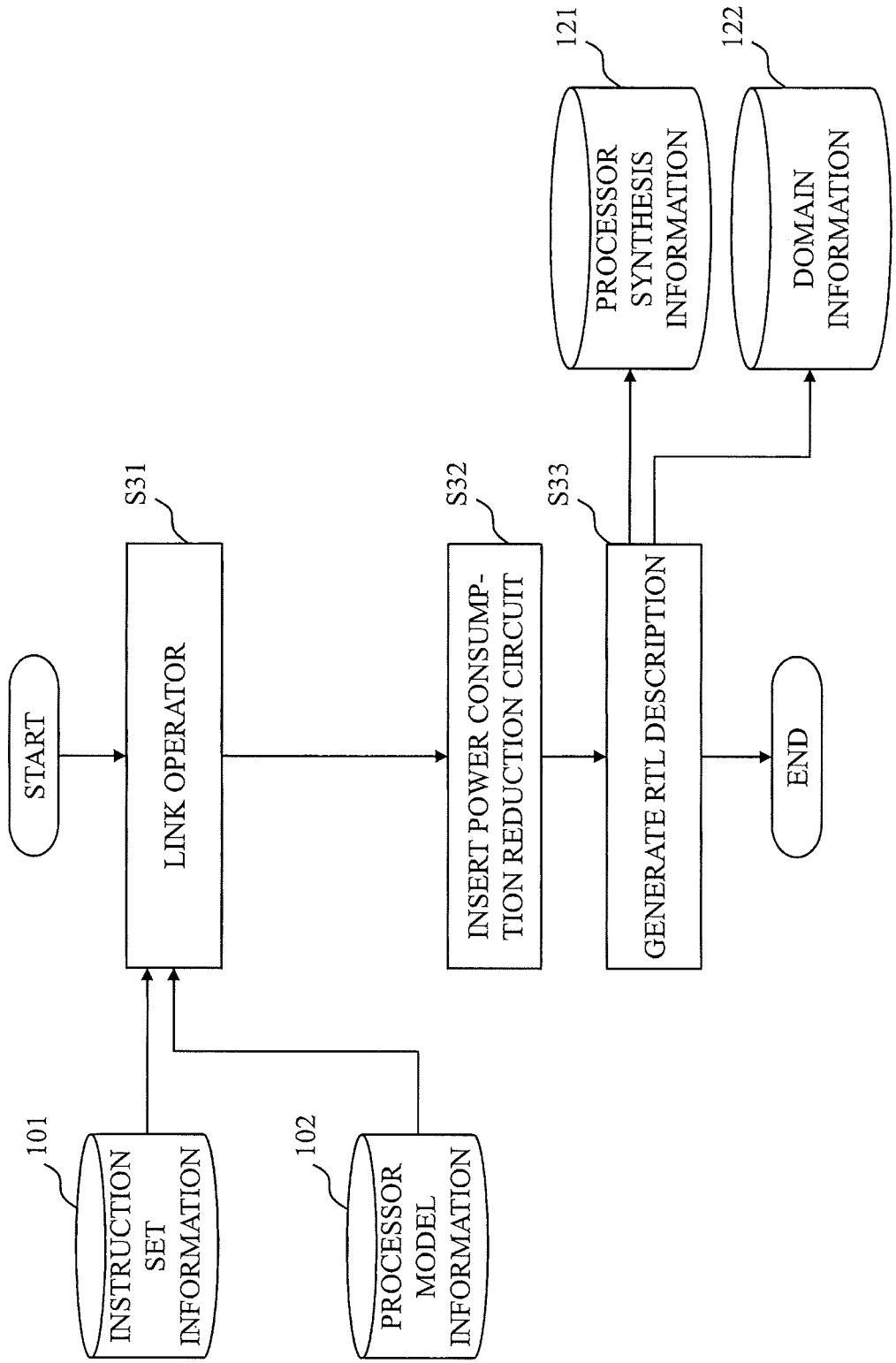

PROCESSOR SYNTHESIS DEVICE, PROCESSOR SYNTHESIS METHOD, AND COMPUTER READABLE MEDIUM

TECHNICAL FIELD

The present invention relates to a processor synthesis device, a processor synthesis method, and a processor synthesis program.

BACKGROUND ART

As a technique for improving the efficiency of developing a processor that is becoming complicated, there is a processor synthesis technique which defines a pipeline structure and an instruction set of a processor by using a special language and outputs a register transfer level (RTL) description. The RTL description is a description that expresses a circuit operation by a combination of data transfer between registers and a logical operation using a hardware description language such as Verilog or VHDL.

An increase in special instructions increases circuit resources such as operators implementing the special instructions. Even when an instruction is not executed, power is consumed because the clock and power are supplied to an operator used in the instruction. Thus, the power consumption increases with the increase in the special instructions.

As a conventional technique for designing a low power circuit, there is a method that focuses on the relationship among a condition determination unit, non-competitive data flow units, and a multiplexer unit within a circuit and adds a clock gating circuit to a circuit unit in the non-competitive data flow units which is unnecessary depending on the condition (refer to Patent Literature 1, for example).

CITATION LIST

Patent Literature

Patent Literature 1: JP 2008-282360 A

SUMMARY OF INVENTION

Technical Problem

The conventional method of designing a low power circuit is applied when synthesizing a circuit with a predetermined sequence as hardware. However, a processor does not have a predetermined sequence so that circuits are operated in a different order depending on the order of instructions input. Therefore, the conventional method of designing a low power circuit cannot be applied when synthesizing a processor.

In order to design a processor with low power consumption, the RTL description can be analyzed to add a power consumption reduction circuit such as a clock gating circuit or a power shut-off circuit. However, the RTL description automatically generated by the processor synthesis technique has poor readability. It is thus difficult and inefficient to design a processor with low power consumption on the basis of the RTL description.

It is an object of the present invention to obtain a circuit configuration of a processor with low power consumption.

Solution to Problem

A processor synthesis device according to one aspect of the present invention includes:

an acquisition unit to acquire instruction set information that defines an instruction set including a plurality of instructions and processor model information that defines a circuit configuration including a plurality of operators; and a generation unit to insert a stop circuit into the circuit configuration of the processor model information acquired by the acquisition unit based on the instruction set information acquired by the acquisition unit, and generate processor synthesis information that defines a circuit configuration into which the stop circuit is inserted, the stop circuit stopping an operator not used in an instruction to be executed among the plurality of operators when each of the plurality of instructions is executed.

Advantageous Effects of Invention

According to the present invention, the stop circuit which stops an operator not required during the execution of each instruction of a processor is inserted into the circuit configuration of the processor based on the definition of the instruction set. Therefore, the circuit configuration of the processor with low power consumption can be obtained.

BRIEF DESCRIPTION OF DRAWINGS

FIG. 1 is a block diagram illustrating a configuration of a processor synthesis device according to a first embodiment.

FIG. 2 is a table illustrating an example of an instruction set according to the first embodiment.

FIG. 11 is a table illustrating an example of an instruction set according to a third embodiment.

FIG. 12 is a flowchart illustrating an operation of a processor synthesis device according to the third embodiment.

DESCRIPTION OF EMBODIMENTS

Figure 3:
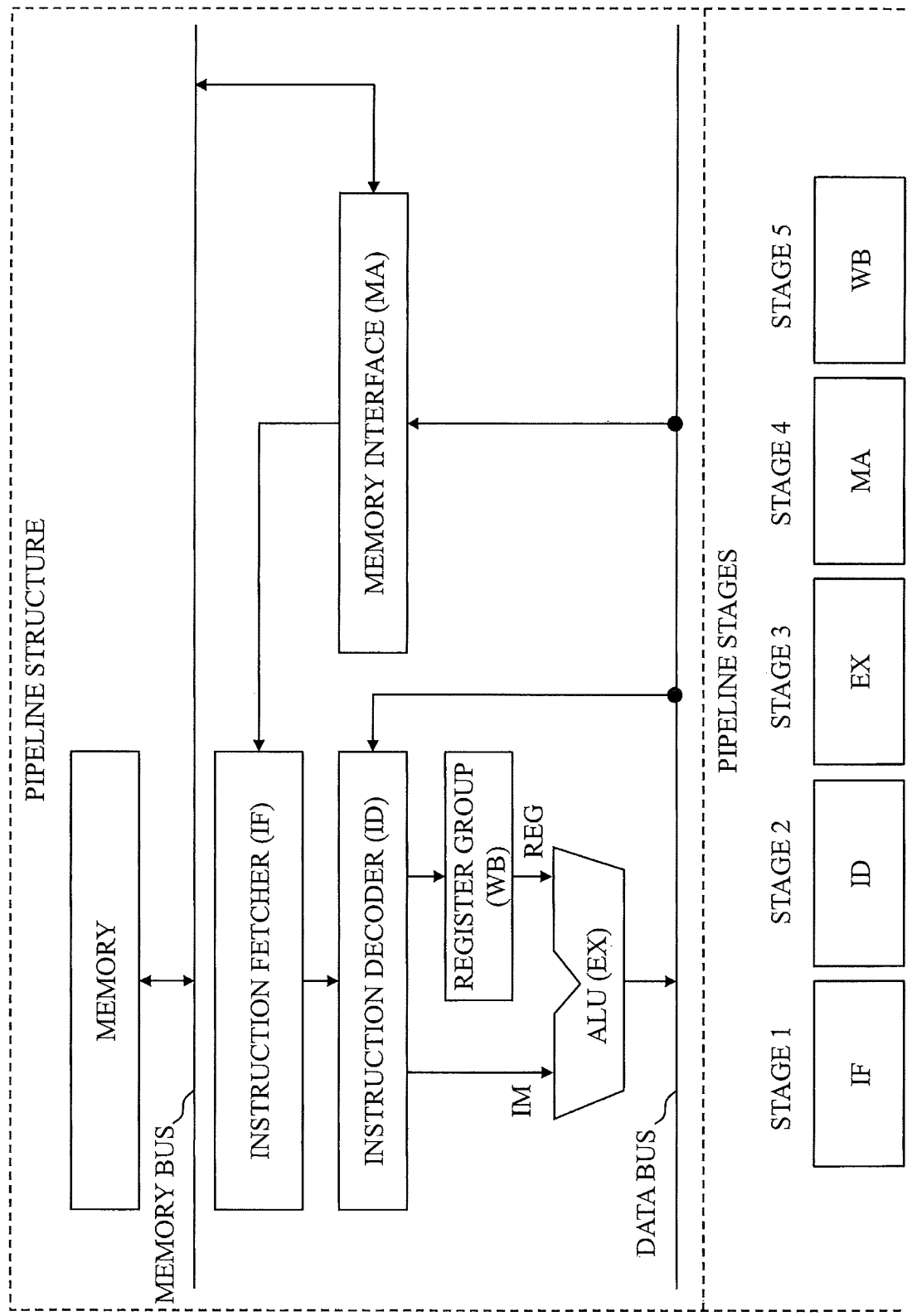
FIG. 3 is a diagram illustrating an example of a processor model according to the first embodiment.

Embodiments of the present invention will now be described with reference to the drawings. Note that parts that are identical or equivalent to each other in the drawings are denoted by the same reference numerals. Descriptions of the parts that are identical or equivalent to each other will be omitted or simplified as appropriate in the description of the embodiments.

First Embodiment

A configuration of a device according to the present embodiment, an operation of the device according to the present embodiment, and effects of the present embodiment will be described in this order.

Description of Configuration

The configuration of a processor synthesis device 111, which is the device according to the present embodiment, will be described with reference to FIG. 1.

The processor synthesis device 111 is a computer. The processor synthesis device 111 includes hardware such as a processor 131 and a memory 132. The processor 131 is connected to other hardware via a signal line to control the other hardware.

The processor synthesis device 111 includes an acquisition unit 112 and a generation unit 113 as functional elements. The functions of the acquisition unit 112 and the generation unit 113 are implemented in software.

The processor 131 is an integrated circuit (IC) that performs processing. The processor 131 is specifically a central processing unit (CPU).

The memory 132 stores instruction set information 101 and processor model information 102 as information input to the processor 131. The memory 132 also stores processor synthesis information 121 and domain information 122 as information output from the processor 131. The memory 132 is specifically a flash memory or a random access memory (RAM).

The processor synthesis device 111 may include an input device, a display, and a communication device as hardware.

The input device is used to input the instruction set information 101 and the processor model information 102 to the processor synthesis device 111. The input device is specifically a mouse, a keyboard, or a touch panel.

The display is used to display the processor synthesis information 121 and the domain information 122 on a screen. The display is specifically a liquid crystal display (LCD).

The communication device includes a receiver for receiving data and a transmitter for transmitting data. The receiver is used to input the instruction set information 101 and the processor model information 102 to the processor synthesis device 111. The transmitter is used to output the processor synthesis information 121 and the domain information 122 from the processor synthesis device 111. The communication device is specifically a communication chip or a network interface card (NIC).

The memory 132 stores a program for implementing the functions of the acquisition unit 112 and the generation unit 113. The program is loaded into the processor 131 to be executed by the processor 131. The memory 132 also stores an operating system (OS). The processor 131 executes the program that implements the functions of the acquisition unit 112 and the generation unit 113 while running the OS.

Note that the OS and the program that implements the functions of the acquisition unit 112 and the generation unit 113 may be stored in an auxiliary storage. The auxiliary storage is specifically a flash memory or a hard disk drive (HDD). The program and the OS stored in the auxiliary storage are loaded into the memory 132 to be executed by the processor 131.

The processor synthesis device 111 may include only one processor 131 or a plurality of the processors 131. The plurality of the processors 131 may execute the program implementing the functions of the acquisition unit 112 and the generation unit 113 in cooperation with one another.

Information, data, a signal value, and a variable value representing a result of processing by the acquisition unit 112 and the generation unit 113 are stored in the memory 132, the auxiliary storage, or a register or cache memory in the processor 131.

The program implementing the functions of the acquisition unit 112 and the generation unit 113 may be stored in a portable recording medium such as a magnetic disk or an optical disk.

The instruction set information 101 is information that defines an instruction set including a plurality of instructions. In the instruction set information 101, instructions as illustrated in FIG. 2 are described in a special language. Note that the special language for defining the instruction set is not generalized as a unified standard, whereby the instruction set may be defined by another method.

The processor model information 102 is information that defines a processor model. Specifically, the processor model information 102 is information that defines architecture such as a circuit configuration including a plurality of operators and a pipeline stage structure. In the processor model information 102, a circuit configuration as illustrated in FIG. 3 is described in a hardware description language such as Verilog or VHDL.

Description of Operation

Figure 4:
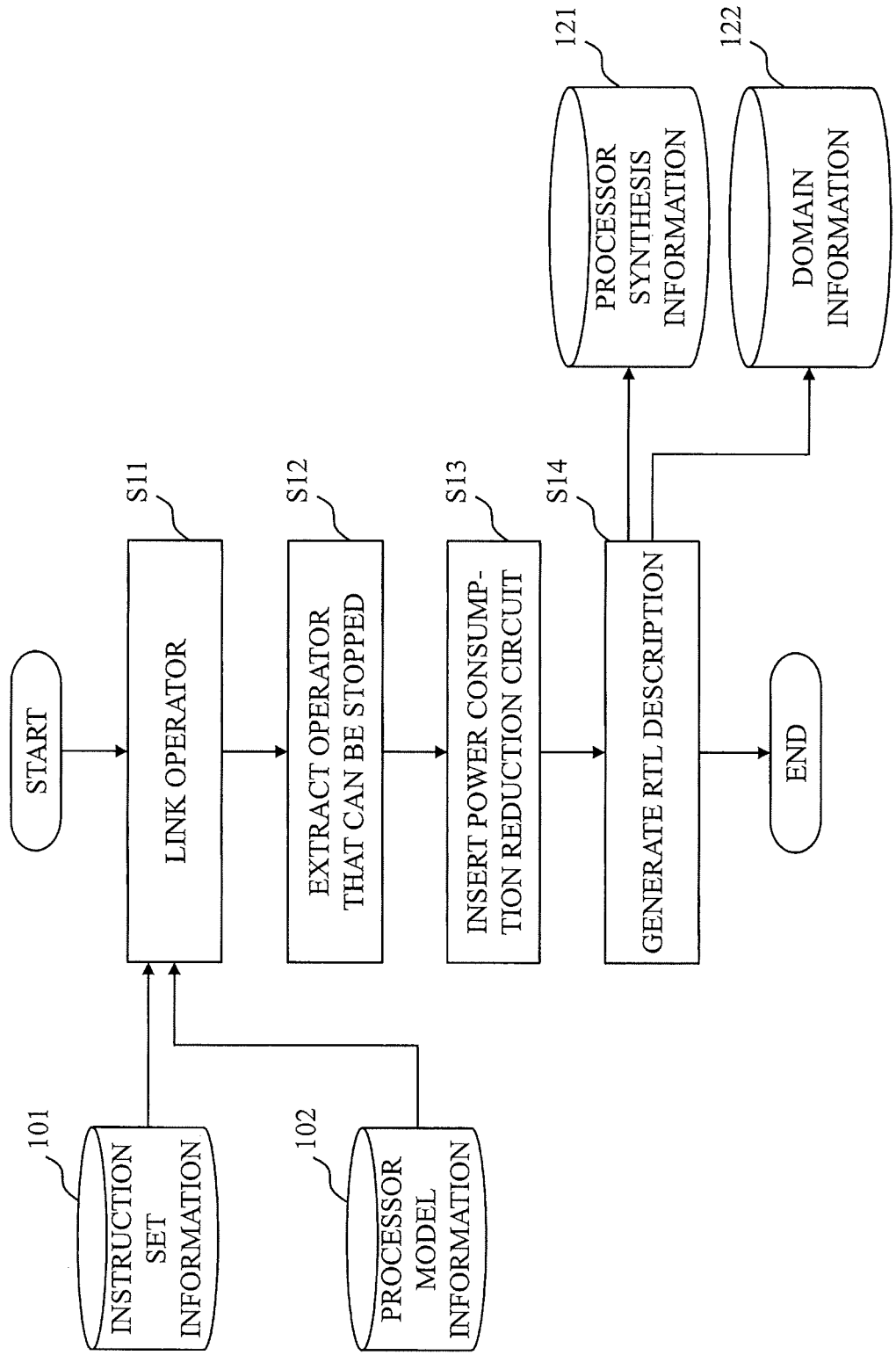
FIG. 4 is a flowchart illustrating an operation of the processor synthesis device according to the first embodiment.

The operation of the processor synthesis device 111, which is the device according to the present embodiment, will be described with reference to FIG. 4. The operation of the processor synthesis device 111 corresponds to a processor synthesis method according to the present embodiment. The operation of the processor synthesis device 111 corresponds to a procedure of a processor synthesis program according to the present embodiment.

Figure 5:
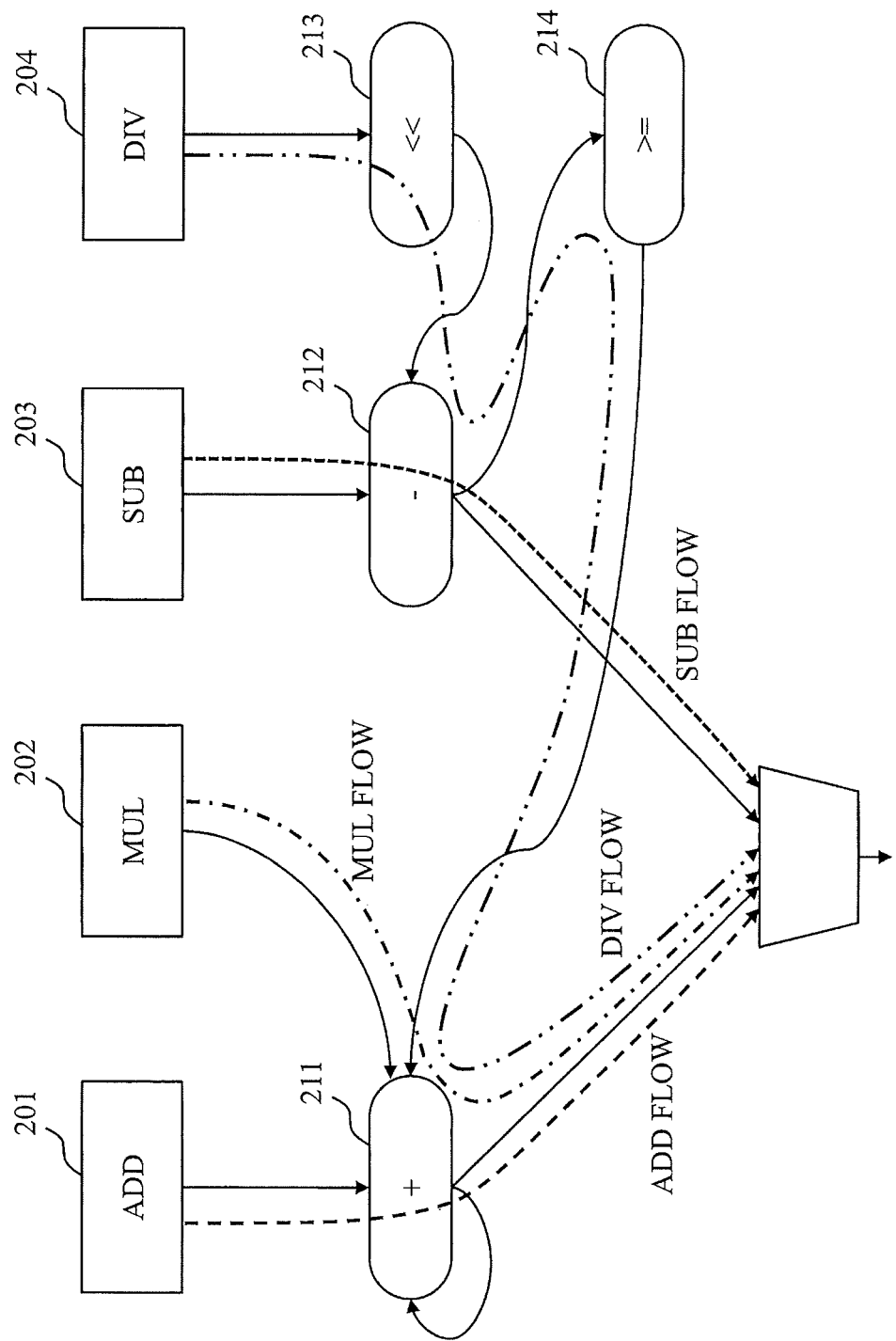
FIG. 5 is a diagram illustrating an example of linking of an operator by the processor synthesis device according to the first embodiment.

In step S11, the acquisition unit 112 acquires the instruction set information 101 and the processor model information 102. Specifically, the acquisition unit 112 reads the instruction set information 101 and the processor model information 102 from the memory 132. The generation unit 113 performs linking of the operators used in each instruction. Specifically, the generation unit 113 uses the graph theory to link the operators as illustrated in FIG. 5. Note that, instead of the method using the graph theory, another method such as a method using a table format may be used as the method of linking the operators.

The following results are obtained as illustrated in FIG. 5 when the operators are linked on the basis of the instruction set of FIG. 2.

An adder 211 is used in an ADD instruction 201.
The adder 211 is used in a MUL instruction 202.
A subtractor 212 is used in a SUB instruction 203.
A shift operator 213, the subtractor 212, a comparator 214, and the adder 211 are used in a DIV instruction 204.

In step S12, the generation unit 113 extracts an operator that can be stopped during the execution of each instruction from the result of linking of the operators. Specifically, on the basis of the result of step S11, the generation unit 113 extracts an operator that is not used during the execution of each instruction as an operator for which a clock or power supply can be shut off.

The following results are obtained when the operator that can be stopped is extracted from the result in FIG. 5.

In the ADD instruction 201, the subtractor 212, the shift operator 213, and the comparator 214 are not used and thus can be stopped.

In the MUL instruction 202, the subtractor 212, the shift operator 213, and the comparator 214 are not used and thus can be stopped.

In the SUB instruction 203, the adder 211, the shift operator 213, and the comparator 214 are not used and thus can be stopped.

In the DIV instruction 204, no operator can be stopped since all the operators are used.

Figure 6:
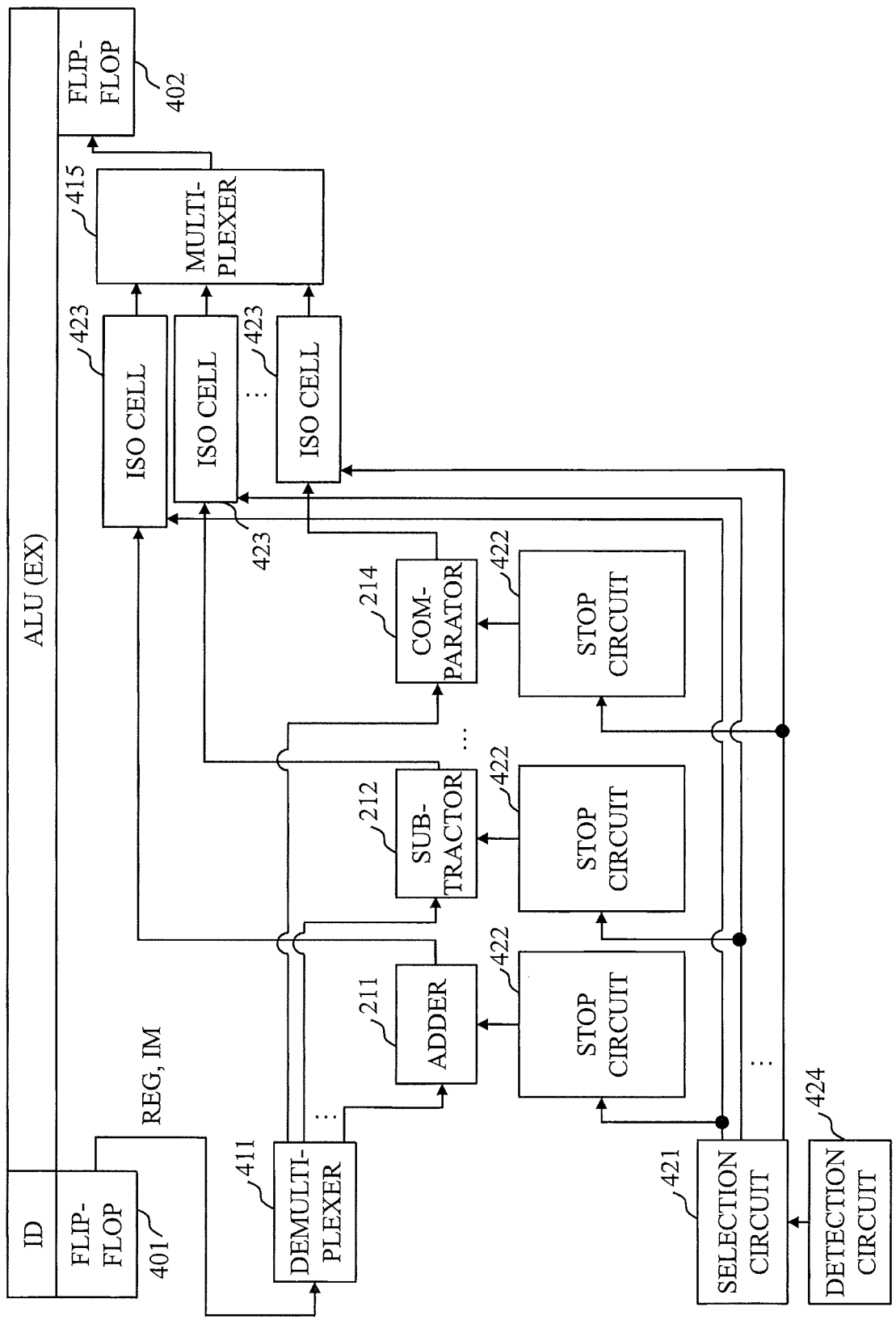
FIG. 6 is a diagram illustrating an example of a circuit configuration in which a power consumption reduction circuit is inserted by the processor synthesis device according to the first embodiment.

In step S13, the generation unit 113 inserts a power consumption reduction circuit into the circuit configuration from the result of extraction of the operators that can be stopped. Specifically, the generation unit 113 inserts, as the power consumption reduction circuit, a stop circuit 422 that stops each operator within an arithmetic logic unit (ALU) of a processor as illustrated in FIG. 6 on the basis of the result of step S12, the processor being synthesized from the processor model and the instruction set. The stop circuit 422 is specifically a clock gating circuit or a power shut-off circuit. Note that although FIG. 6 illustrates only the adder 211, the subtractor 212, and the comparator 214 as the operators, the shift operator 213 is also included in the ALU in practice. A stop circuit 422 for stopping the shift operator 213 is also inserted into the ALU as the power consumption reduction circuit.

Detailed processing of step S13 will be described with reference to FIG. 6.

The generation unit 113 first generates a processor circuit including the following elements to implement pipeline stages from the processor model and the instruction set.
(1) Flip-flops 401 and 402 that divide the pipeline stages
(2) A demultiplexer 411 that selects an operator to be used in accordance with an instruction input to the processor
(3) The adder 211, the subtractor 212, the shift operator 213, and the comparator 214 which are the operators executing the instructions
(4) A multiplexer 415 that selects an operation result to be output in accordance with an instruction input to the processor Next, the generation unit 113 inserts the power consumption reduction circuit, that is, the following circuits for the low power design, into the processor circuit above.
(1) a selection circuit 421 that controls shut-off of the clock or power supply for the operator not used during the execution of each instruction
(2) a clock gating circuit that shuts off the clock for each operator, or a stop circuit 422 which is the power shut-off circuit that shuts off the power supply for each operator
(3) an isolation cell 423 that prevents an indefinite value output from each operator from propagating to a subsequent circuit when the clock or power supply for each operator is shut off
(4) a detection circuit 424 that detects an instruction input to the processor Functions of the detection circuit 424 and the selection circuit 421 will now be described. Note that functions of the stop circuit 422 and the isolation cell 423 may be the same as conventional functions thereof.

The detection circuit 424 detects the instruction input to the processor, and outputs the type of instruction executed in an EX stage of the pipeline to the selection circuit 421.

The selection circuit 421 performs clock gating or power shut-off against all the operators in the ALU by the stop circuit 422, when the instruction input to the processor is being fetched in an IF stage of the pipeline and when being decoded in an ID stage of the pipeline. As a result, the power consumption of the EX stage of the pipeline not executing the instruction can be reduced.

After the instruction is decoded in the ID stage of the pipeline, the selection circuit 421 releases clock gating or power shut-off for the operator used in the EX stage of the pipeline in accordance with the type output from the detection circuit 424. As a result, only the operator used in the EX stage of the pipeline in the middle of executing the instruction consumes power, and the operator not used consumes no power. Therefore, the power consumption of the EX stage of the pipeline in the middle of executing the instruction can also be reduced.

After the instruction is executed in the EX stage of the pipeline, the selection circuit 421 performs clock gating or power shut-off against all the operators in the ALU by the stop circuit 422. As a result, the power consumption of the EX stage of the pipeline not executing the instruction can be reduced.

As described above, in steps S11 to S13, the generation unit 113 inserts the stop circuit 422 into the circuit configuration of the processor model information 102 acquired by the acquisition unit 112 based on the instruction set information 101 acquired by the acquisition unit 112. Specifically, in steps S11 and S12, the generation unit 113 identifies an operator that is not used in at least any of a plurality of instructions from among a plurality of operators, on the basis of the instruction set information 101 including information that indicates the operator used in each of the plurality of instructions. In the examples of FIGS. 5 and 6, the adder 211, the subtractor 212, the shift operator 213, and the comparator 214 correspond to the "plurality of operators", and the ADD instruction 201, the MUL instruction 202, the SUB instruction 203, and the DIV instruction 204 correspond to the "plurality of instructions". In step S13, the generation unit 113 connects the stop circuit 422 to the operator identified in step S12 in the circuit configuration of the processor model information 102. The stop circuit 422 is a circuit that stops an operator not used in an instruction being executed among the plurality of operators, when each of the plurality of instructions is executed. Specifically, the stop circuit 422 is a circuit that stops an operator connected to the stop circuit 422 by shutting off the clock or power supply. As a specific example, the stop circuit 422 connected to the adder 211 is a circuit that shuts off the supply of clock or power to the adder 211 when the SUB instruction 203 is executed.

In steps S11 to S13, the generation unit 113 further inserts the detection circuit 424 and the selection circuit 421 into the circuit configuration of the processor model information 102 acquired by the acquisition unit 112, based on the instruction set information 101 acquired by the acquisition unit 112. The detection circuit 424 is a circuit that detects an instruction to be executed and outputs a detection result when each of the plurality of instructions is executed. The selection circuit 421 is a circuit that selects an operator to be stopped by the stop circuit 422 from among the plurality of operators in accordance with the detection result from the detection circuit. As a specific example, when the SUB instruction 203 is executed, the detection circuit 424 detects the SUB instruction 203 and sends a signal indicating the SUB instruction 203 to the selection circuit 421. The selection circuit 421 receives the signal and selects the adder 211, the shift operator 213, and the comparator 214. More specifically, the selection circuit 421 controls the three stop circuits 422 connected to the adder 211, the shift operator 213, and the comparator 214 to stop the adder 211, the shift operator 213, and the comparator 214.

In step S14, the generation unit 113 outputs the processor synthesis information 121 and a power format, that is, the domain information 122 which is the design information of the clock or power supply for each operator, the processor synthesis information being an RTL description of the processor circuit which is generated in step S13 and in which the power consumption reduction circuit is inserted.

As described above, in step S14, the generation unit 113 generates the processor synthesis information 121 defining the circuit configuration in which the stop circuit 422, the detection circuit 424, and the selection circuit 421 are inserted.

Description of Advantageous Effects of Embodiment

In the present embodiment, the stop circuit 422 which stops an operator not required during the execution of each instruction of the processor is inserted into the circuit configuration of the processor based on the definition of the instruction set. Therefore, the circuit configuration of the processor with low power consumption can be obtained.

In automatically generating the RTL description from the processor model having a higher level of abstraction than the RTL description, the present embodiment can generate the processor with low power consumption by inserting the power consumption reduction circuit, which performs clock gating or power shut-off against the operator not used in the instruction input to the processor, in accordance with the instruction.

Another Configuration

The functions of the acquisition unit 112 and the generation unit 113 are implemented in software in the present embodiment, but may be implemented by a combination of software and hardware as a variation. That is, some of the functions of at least one of the acquisition unit 112 and the generation unit 113 may be implemented in dedicated hardware, while the rest may be implemented in software.

The processor 131 and the memory 132 are collectively referred to as a "processing circuit". That is, the functions of the acquisition unit 112 and the generation unit 113 are implemented by the processing circuit regardless of whether the functions of the acquisition unit 112 and the generation unit 113 are implemented in software or by the combination of software and hardware.

The "unit" may be replaced with a "step", a "procedure", or "processing".

Second Embodiment

A configuration of a device according to the present embodiment, an operation of the device according to the present embodiment, and effects of the present embodiment will be described in this order. Differences from the first embodiment will mainly be described.

Description of Configuration

Figure 7:
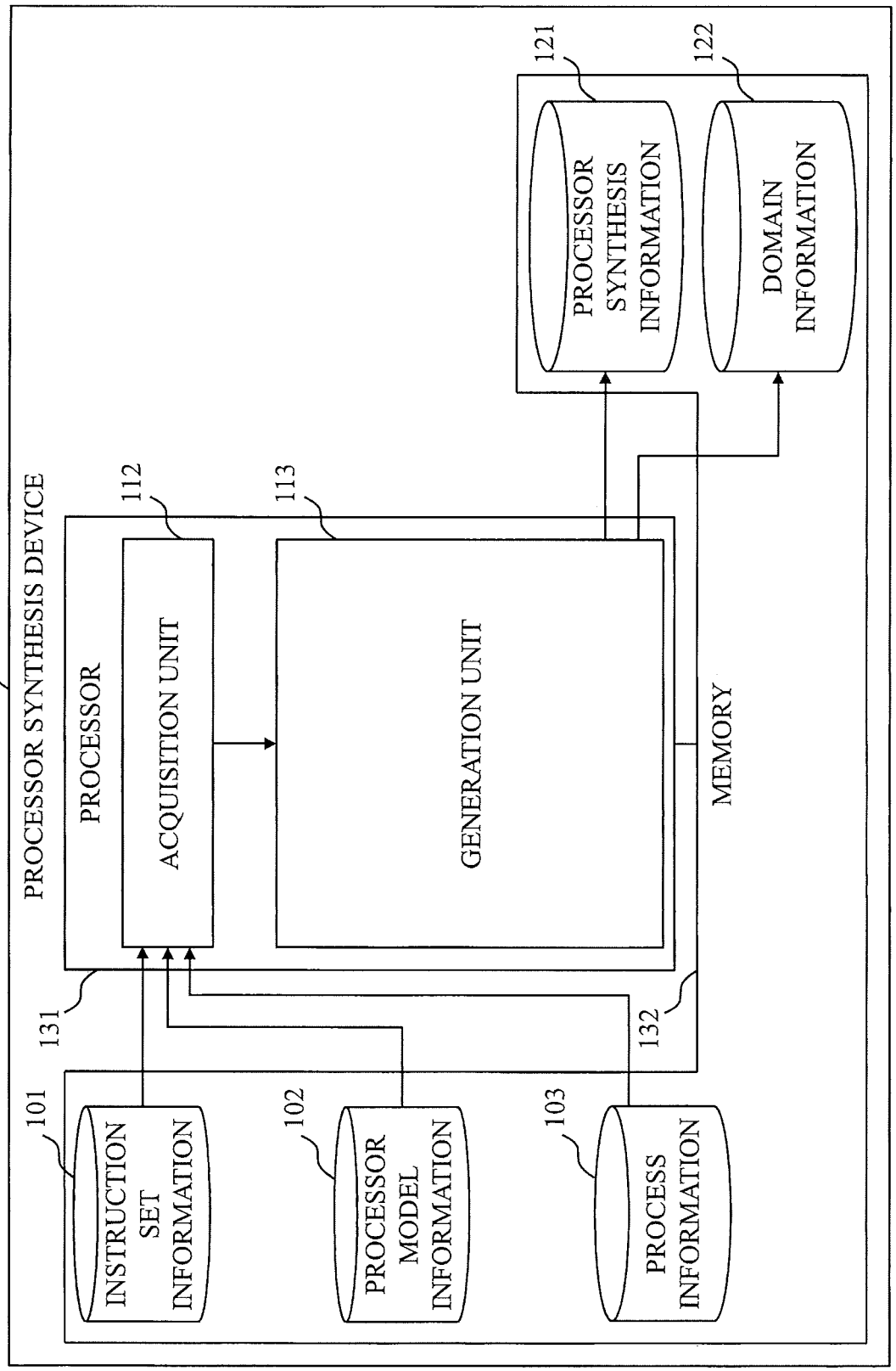
FIG. 7 is a block diagram illustrating a configuration of a processor synthesis device according to a second embodiment.

The configuration of the processor synthesis device 111, which is the device according to the present embodiment, will be described with reference to FIG. 7.

The configuration of the processor synthesis device 111 is the same as that of the first embodiment illustrated in FIG. 1.

In the present embodiment, the memory 132 further stores process information 103 as information input to the processor 131.

The process information 103 is information that defines the time required for each of the plurality of operators to be operable after shut-off of a clock or power supply for the operator is released. In the present embodiment, the processor synthesis device 111 uses the process information 103 to be able to change a timing to release clock gating or power shut-off in accordance with a process of manufacturing a processor.

Description of Operation

Figure 8:
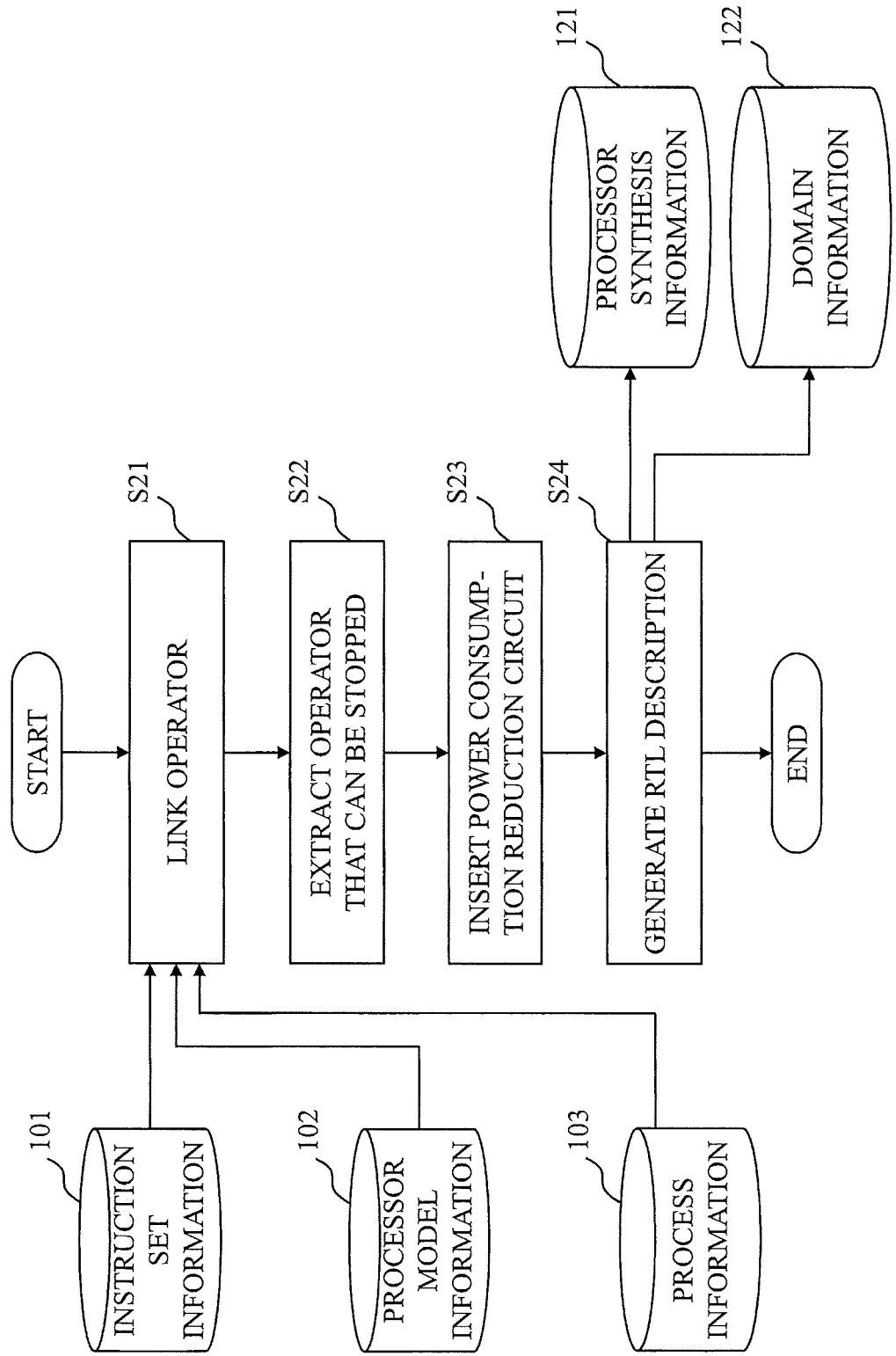
FIG. 8 is a flowchart illustrating an operation of the processor synthesis device according to the second embodiment.

The operation of the processor synthesis device 111, which is the device according to the present embodiment, will be described with reference to FIG. 8. The operation of the processor synthesis device 111 corresponds to a processor synthesis method according to the present embodiment. The operation of the processor synthesis device 111 corresponds to a procedure of a processor synthesis program according to the present embodiment.

In step S21, the acquisition unit 112 acquires the instruction set information 101, the processor model information 102, and the process information 103. Specifically, the acquisition unit 112 reads the instruction set information 101, the processor model information 102, and the process information 103 from the memory 132. As in step S11 of the first embodiment, the generation unit 113 links the operators used in each instruction.

Step S22 is the same as step S12 of the first embodiment.

In step S23, the generation unit 113 inserts a power consumption reduction circuit into the circuit configuration as in step S13 of the first embodiment. In the present embodiment, the generation unit 113 uses the process information 103 acquired by the acquisition unit 112 to adjust the time from when the stop circuit 422 starts shut-off of the clock or power supply to when the shut-off is released in the circuit configuration of the processor synthesis information 121, that is, in the circuit configuration in which the stop circuit 422 is already inserted.

When the stop circuit 422 shuts off the power supply in particular, the circuit takes time to be operable after the power shut-off is released. In the present embodiment, the generation unit 113 reads the time included in the process information 103, namely the time for the circuit to be operable after the release of the power shut-off, thereby being able to generate a processor for which the timing to release the power shut-off is changed.

Figure 9:
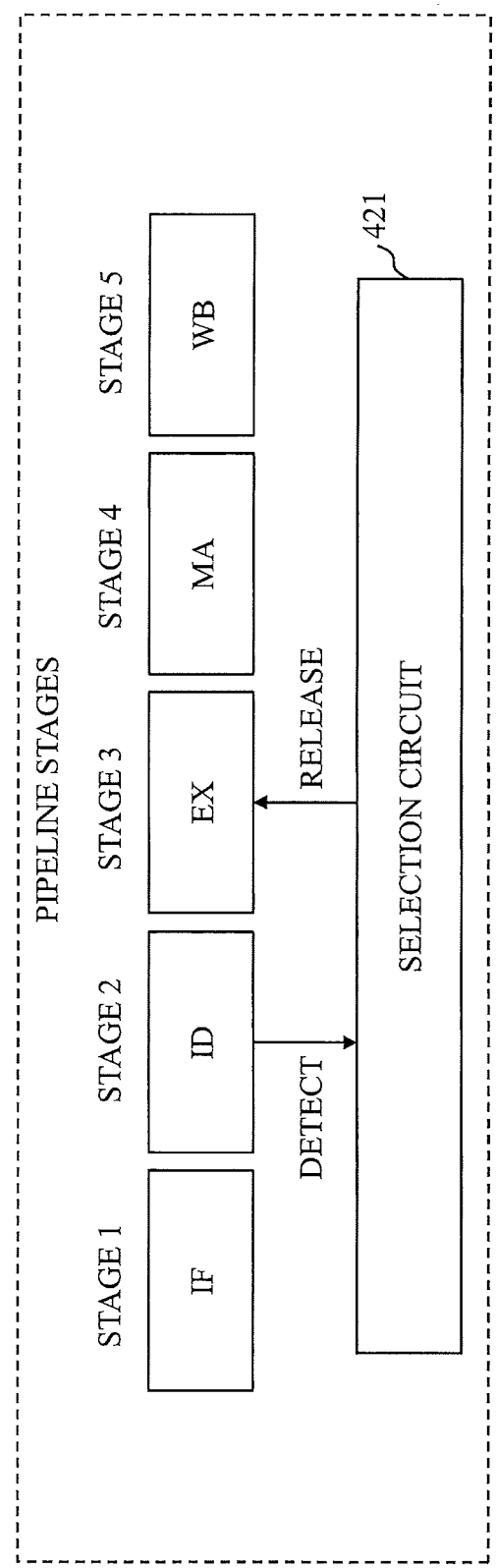
FIG. 9 is a diagram illustrating a first example of a period of time from when a stop circuit according to the second embodiment starts shut-off of a clock or power supply to when the shut-off is released.
Figure 10:
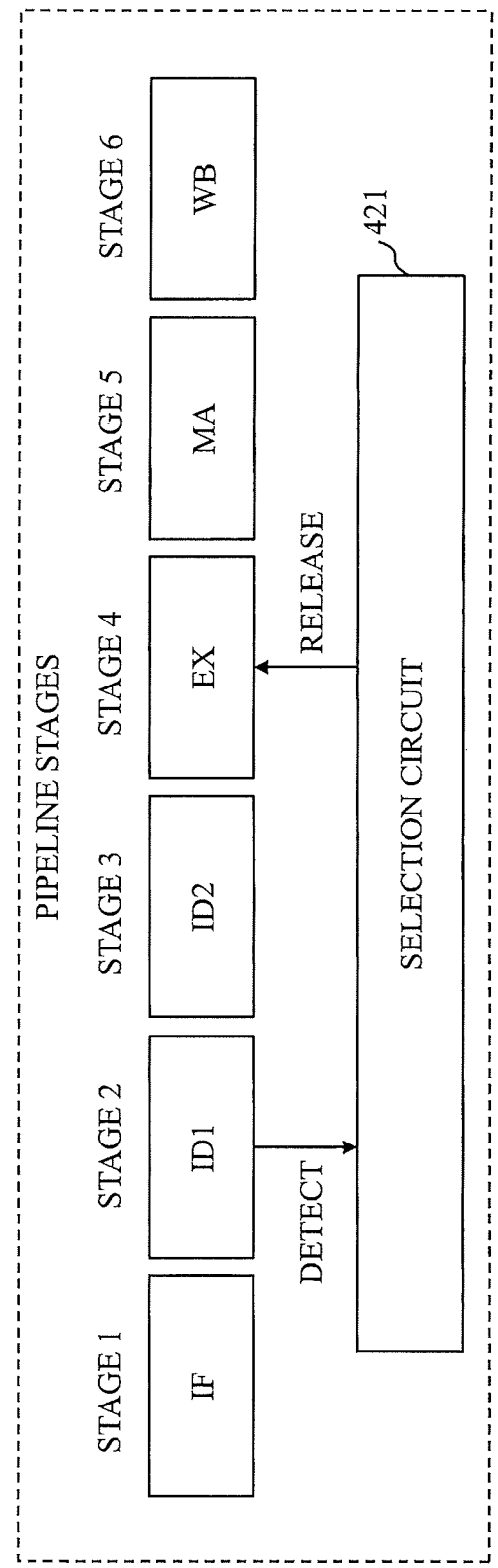
FIG. 10 is a diagram illustrating a second example of a period of time from when the stop circuit according to the second embodiment starts shut-off of the clock or power supply to when the shut-off is released.

Here, FIGS. 9 and 10 illustrate examples of two processors generated to have different times until the release the power shut-off due to process differences.

In the example of FIG. 9, the circuit requires a short time to be operable, whereby the selection circuit 421 detects that an instruction is decoded in the ID stage of the pipeline and then releases the power shut-off in the EX stage of the pipeline.

In the example of FIG. 10, the circuit requires a long time to be operable so that the ID stage of the pipeline is increased to two. This ensures the time for the circuit to be operable. The selection circuit 421 detects that an instruction is decoded in a first ID stage of the pipeline and then releases the power shut-off in the EX stage of the pipeline.

Step S24 is the same as step S14 of the first embodiment.

Description of Advantageous Effects of Embodiment

The present embodiment can change the stage in which clock gating or power shut-off is released.

As with the first embodiment, the functions of the acquisition unit 112 and the generation unit 113 are implemented in software in the present embodiment, but may be implemented by a combination of software and hardware as in the variation of the first embodiment.

Third Embodiment

A configuration of a device according to the present embodiment, an operation of the device according to the present embodiment, and effects of the present embodiment will be described in this order. Differences from the first embodiment will mainly be described.

Description of Configuration

The configuration of the processor synthesis device 111 which is the device according to the present embodiment is the same as that of the first embodiment illustrated in FIG. 1.

In the present embodiment, as illustrated in FIG. 11, an instruction set of the instruction set information 101 includes a plurality of stop instructions corresponding one-to-one to a plurality of instructions. Also included is a plurality of start instructions corresponding one-to-one to the plurality of instructions. Each of the plurality of stop instructions is an instruction that causes the stop circuit 422 to stop an operator not used in a corresponding instruction among the plurality of operators. Each of the plurality of start instructions is an instruction that starts an operator not used in a corresponding instruction and stopped by the stop circuit 422, among the plurality of operators. As a specific example, a stop instruction corresponding to the ADD instruction 201 is an ADD_OFF instruction. The ADD_OFF instruction stops operators that are not used in the ADD instruction 201, namely, the subtractor 212, the shift operator 213, and the comparator 214. A start instruction corresponding to the ADD instruction 201 is an ADD_ON instruction. The ADD_ON instruction starts the operators stopped by the ADD_OFF instruction, namely, the subtractor 212, the shift operator 213, and the comparator 214.

Description of Operation

The operation of the processor synthesis device 111, which is the device according to the present embodiment, will be described with reference to FIG. 12. The operation of the processor synthesis device 111 corresponds to a processor synthesis method according to the present embodiment. The operation of the processor synthesis device 111 corresponds to a procedure of a processor synthesis program according to the present embodiment.

Step S31 is the same as step S11 of the first embodiment.

Extraction of an operator that can be stopped as in step S12 of the first embodiment is not required in the present embodiment.

Figure 13:
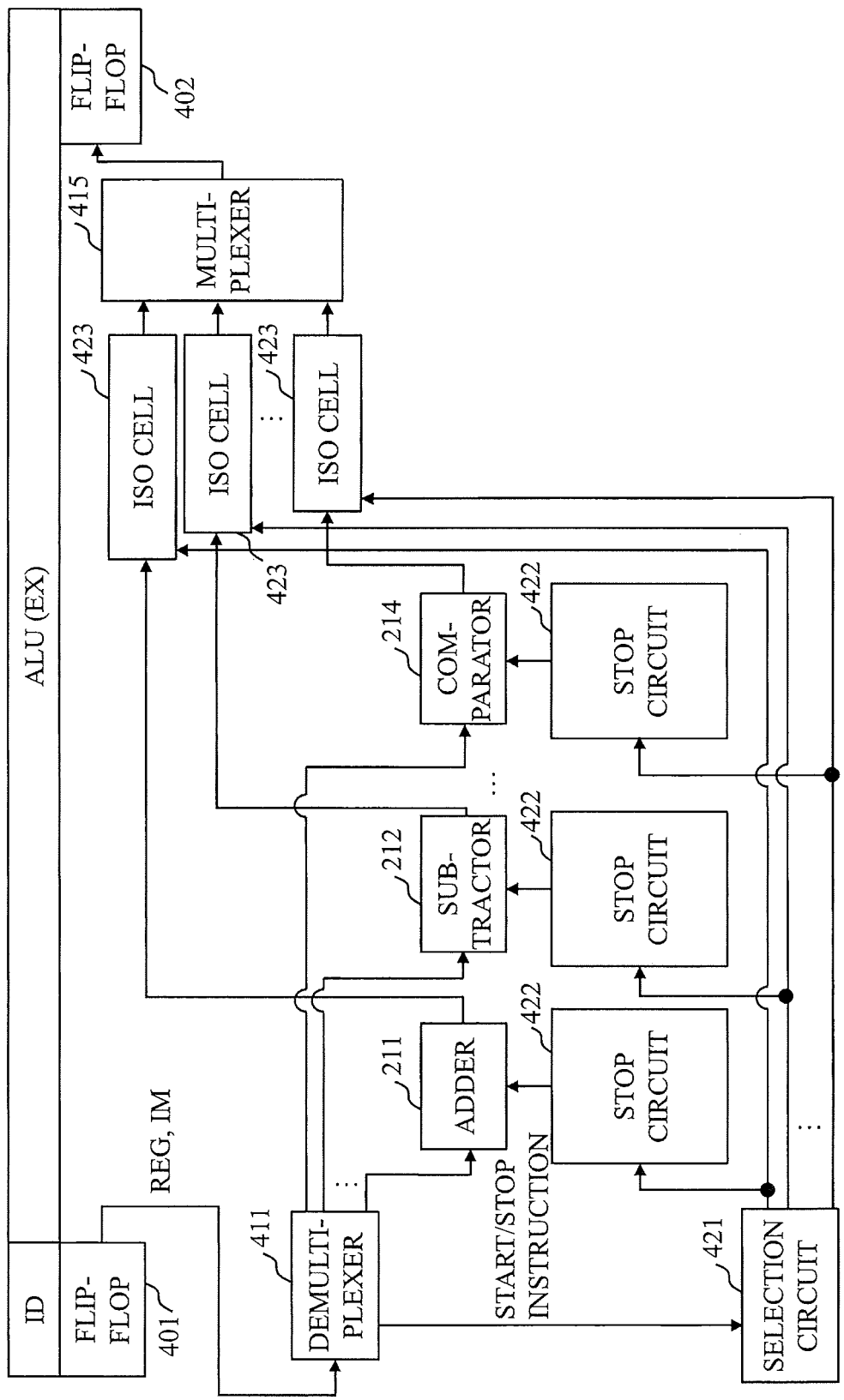
FIG. 13 is a diagram illustrating an example of a circuit configuration in which a power consumption reduction circuit is inserted by the processor synthesis device according to the third embodiment.

In step S32, the generation unit 113 inserts a power consumption reduction circuit into the circuit configuration based on the instruction set information 101 acquired in step S31. Specifically, as illustrated in FIG. 13, the generation unit 113 adds the stop circuit 422 to an operator that can be stopped by the stop instruction included in the instruction set. Note that the generation unit 113 may add the stop circuit 422 to all the operators.

The generation unit 113 further inserts the selection circuit 421 into the ALU. The detection circuit 424 is unnecessary.

The processor circuit of FIG. 13 is configured such that, when each instruction to start an operator is input, a start instruction is output to the selection circuit 421 so that the selection circuit 421 starts the operator used in the corresponding instruction. When each instruction to stop an operator is input, a stop instruction is output to the selection circuit 421 so that the selection circuit 421 stops the operator used in the corresponding instruction. As a result, the power consumption of the processor can be reduced.

Step S33 is the same as step S14 of the first embodiment.

Description of Advantageous Effects of Embodiment

The present embodiment uses the instruction set including the instructions for starting or stopping the operators in the processor to be able to perform clock gating or power shut-off against the operators by an instruction to the processor. The selection circuit 421 can be simplified since the selection circuit 421 need not automatically select an unused operator in accordance with the type of instruction as it is required in the first and second embodiments.

As with the first embodiment, the functions of the acquisition unit 112 and the generation unit 113 are implemented in software in the present embodiment, but may be implemented by a combination of software and hardware as in the variation of the first embodiment.

While the embodiments of the present invention have been described, two or more of those embodiments may be combined and implemented. Alternatively, one or a combination of two or more of those embodiments may be partially implemented. Note that the present invention is not to be limited by those embodiments but can be modified in various manners as needed.

REFERENCE SIGNS LIST

101: instruction set information, 102: processor model information, 103: process information, 111: processor synthesis device, 112: acquisition unit, 113: generation unit, 121: processor synthesis information, 122: domain information, 131: processor, 132: memory, 201: ADD instruction, 202: MUL instruction, 203: SUB instruction, 204: DIV instruction, 211: adder, 212: subtractor, 213: shift operator, 214: comparator, 401: flip-flop, 402: flip-flop, 411: demultiplexer, 415: multiplexer, 421: selection circuit, 422: stop circuit, 423: isolation cell, 424: detection circuit

The invention claimed is:

1. A processor synthesis device comprising:
   processing circuitry:
   to acquire instruction set information that defines an instruction set including a plurality of instructions and processor model information that defines a circuit configuration including a plurality of operators;
   to link the plurality of operators of the circuit configuration based on the plurality of instructions;

to identify, based on the linking of the plurality of operators, operators that are not used during the execution of each instruction; and to insert a stop circuit into the circuit configuration of the processor model information based on the instruction set information, and generate processor synthesis information that defines a circuit configuration into which the stop circuit is inserted, the stop circuit stopping each identified operator not used in an instruction from being executed among the plurality of operators when each of the plurality of instructions is executed.

2. The processor synthesis device according to claim 1, wherein the instruction set information includes information that indicates an operator used in each of the plurality of instructions, and the processing circuitry identifies, from the instruction set information, an operator not used in at least one of the plurality of instructions among the plurality of operators, and connects the stop circuit to the operator being identified in the circuit configuration of the processor model information.

3. The processor synthesis device according to claim 1, wherein the processing circuitry further inserts a detection circuit and a selection circuit into the circuit configuration of the processor model information based on the instruction set information, and generates information that defines a circuit configuration into which the stop circuit, the detection circuit, and the selection circuit are inserted as the processor synthesis information, the detection circuit detecting an instruction to be executed and outputting a detection result when each of the plurality of instructions is executed, and the selection circuit selecting an operator to be stopped by the stop circuit from among the plurality of operators in accordance with the detection result from the detection circuit.

4. The processor synthesis device according to claim 1, wherein the instruction set of the instruction set information includes a plurality of stop instructions corresponding one-to-one to the plurality of instructions, and each of the plurality of stop instructions is an instruction that causes the stop circuit to stop an operator not used in a corresponding instruction among the plurality of operators.

5. The processor synthesis device according to claim 1, wherein the stop circuit is a circuit that stops an operator connected to the stop circuit by shutting off a clock or power supply, the processing circuitry further acquires process information that defines time for each of the plurality of operators to be operable after shut-off of the clock or power supply is released, and the processing circuitry adjusts time from when the stop circuit starts the shut-off of the clock or power supply to when the stop circuit releases the shut-off in the circuit configuration of the processor synthesis information, based on the process information.

6. The processor synthesis device according to claim 2, wherein the processing circuitry further inserts a detection circuit and a selection circuit into the circuit configuration of the processor model information based on the instruction set information, and generates information that defines a circuit configuration into which the stop circuit, the detection circuit, and the selection circuit are inserted as the processor synthesis information, the detection circuit detecting an instruction to be executed and outputting a detection result when each of the plurality of instructions is executed, and the selection circuit selecting an operator to be stopped by the stop circuit from among the plurality of operators in accordance with the detection result from the detection circuit.

7. The processor synthesis device according to claim 2, wherein the instruction set of the instruction set information includes a plurality of stop instructions corresponding one-to-one to the plurality of instructions, and each of the plurality of stop instructions is an instruction that causes the stop circuit to stop an operator not used in a corresponding instruction among the plurality of operators.

8. The processor synthesis device according to claim 2, wherein the stop circuit is a circuit that stops an operator connected to the stop circuit by shutting off a clock or power supply, the processing circuitry further acquires process information that defines time for each of the plurality of operators to be operable after shut-off of the clock or power supply is released, and the processing circuitry adjusts time from when the stop circuit starts the shut-off of the clock or power supply to when the stop circuit releases the shut-off in the circuit configuration of the processor synthesis information, based on the process information.

9. The processor synthesis device according to claim 3, wherein the stop circuit is a circuit that stops an operator connected to the stop circuit by shutting off a clock or power supply, the processing circuitry further acquires process information that defines time for each of the plurality of operators to be operable after shut-off of the clock or power supply is released, and the processing circuitry adjusts time from when the stop circuit starts the shut-off of the clock or power supply to when the stop circuit releases the shut-off in the circuit configuration of the processor synthesis information, based on the process information.

10. The processor synthesis device according to claim 4, wherein the stop circuit is a circuit that stops an operator connected to the stop circuit by shutting off a clock or power supply, the processing circuitry further acquires process information that defines time for each of the plurality of operators to be operable after shut-off of the clock or power supply is released, and the processing circuitry adjusts time from when the stop circuit starts the shut-off of the clock or power supply to when the stop circuit releases the shut-off in the circuit configuration of the processor synthesis information, based on the process information.

11. The processor synthesis device according to claim 6, wherein the stop circuit is a circuit that stops an operator connected to the stop circuit by shutting off a clock or power supply, the processing circuitry further acquires process information that defines time for each of the plurality of operators to be operable after shut-off of the clock or power supply is released, and the processing circuitry adjusts time from when the stop circuit starts the shut-off of the clock or power supply to when the stop circuit releases the shut-off in the circuit configuration of the processor synthesis information, based on the process information.

12. The processor synthesis device according to claim 7, wherein the stop circuit is a circuit that stops an operator connected to the stop circuit by shutting off a clock or power supply, the processing circuitry further acquires process information that defines time for each of the plurality of operators to be operable after shut-off of the clock or power supply is released, and the processing circuitry adjusts time from when the stop circuit starts the shut-off of the clock or power supply to when the stop circuit releases the shut-off in the circuit configuration of the processor synthesis information, based on the process information.

13. A processor synthesis method comprising:

acquiring instruction set information that defines an instruction set including a plurality of instructions and processor model information that defines a circuit configuration including a plurality of operators;

linking the plurality of operators of the circuit configuration based on the plurality of instructions;

identifying, based on the linking of the plurality of operators, operators that are not used during execution of each instruction; and inserting a stop circuit into the circuit configuration of the processor model information based on the instruction set information, and generating processor synthesis information that defines a circuit configuration into which the stop circuit is inserted, the stop circuit stopping each identified operator not used in an instruction from being executed among the plurality of operators when each of the plurality of instructions is executed.

14. A non-transitory computer readable medium storing a processor synthesis program that causes a computer to execute:

processing to acquire instruction set information that defines an instruction set including a plurality of instructions and processor model information that defines a circuit configuration including a plurality of operators;

processing to link the plurality of operators of the circuit configuration based on the plurality of instructions;

processing to identify, based on the linking of the plurality of operators, operators that are not used during the execution of each instruction; and processing to insert a stop circuit into the circuit configuration of the processor model information based on the instruction set information, and generate processor synthesis information that defines a circuit configuration into which the stop circuit is inserted, the stop circuit stopping each identified operator not used in an instruction from being executed among the plurality of operators when each of the plurality of instructions is executed.

* * * * *